Aug. 31, 1954
W. D. CANNON
2,687,935
SIGNAL AMPLIFYING SYSTEM FOR ELECTRICALLY
ACTUATED RECORDING DEVICES
Filed Feb. 10, 1948
2 Sheets-Sheet 2
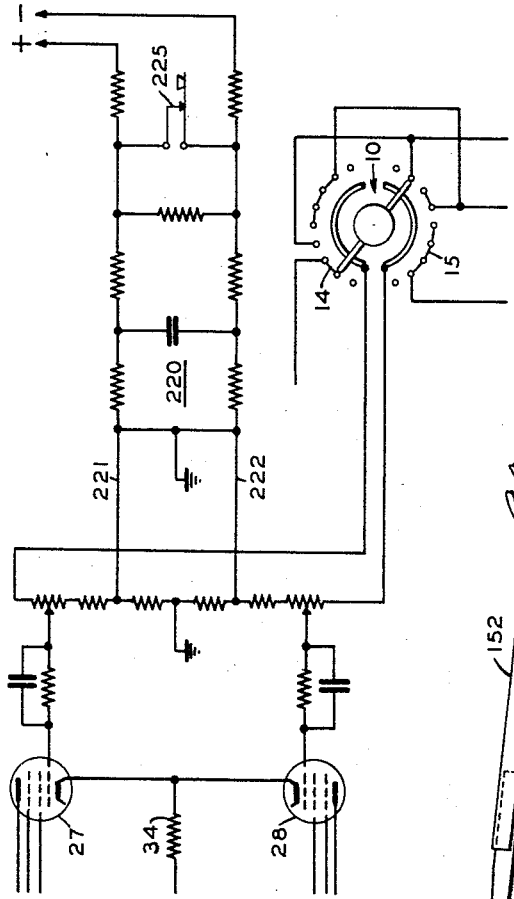
FIG. 2
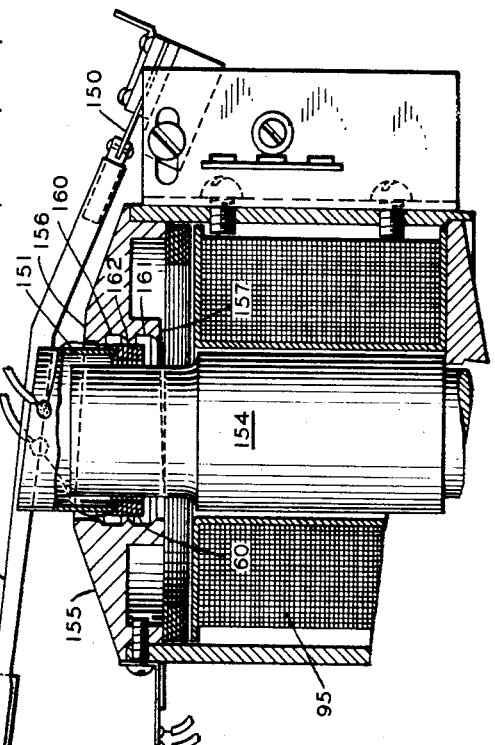
FIG. 3
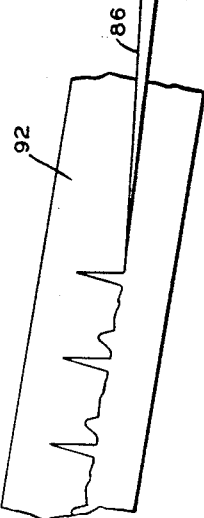
INVENTOR.
W. D. CANNON
BY
W.C. Middleton
ATTORNEY Patented Aug. 31, 1954

2,687,935

UNITED STATES PATENT OFFICE 2,687,935

SIGNAL AMPLIFYING SYSTEM FOR ELECTRICALLY ACTUATED RECORDING DEVICES

William D. Cannon, Metuchen, N. J., assignor to The Western Union Telegraph Company, New York, N. Y., a corporation of New York Application February 10, 1948, Serial No. 7,428

6 Claims. (Cl. 346—33)

1

This invention relates generally to an electrically actuated recording unit and more particularly to such units which are capable of producing extremely accurate recording on electrosensitive recording paper of variable electric potentials of small magnitude over a frequency range extending to very low values. The device is particularly adapted for use in the medical field, for example, in electrocardiographs, encephalographs and other similar devices for recording electrical reactions resulting from biological processes. The device of the present invention comprises an improvement over the device described and claimed in the copending application of W. D. Cannon et al. application Serial No. 576,078, filed February 3, 1945 for "Electrically Actuated Recording Unit," now Patent No. 2,502,419, issued April 4, 1950.

Electrocardiographs are used for delineating potentials which may be extremely small in value and which may also be irregular in pattern. Consequently, such potentials must be amplified by an amplifier of considerable sensitivity to such an extent as to permit them to operate the recording device. To gain the necessary sensitivity extraordinary measures must be followed to immunize the amplifier from extraneous interference. Aside from the interference which may enter over the power supply leads or result from power supply potential variations, the amplifier itself, leads, and the patient all tend to pick up interference statically from power wires, radio stations, atmospheric discharges and other sources. The amplifier, therefore, should be shielded by means of a suitable metallic housing and a shield should be provided for the primary winding of the power transformer. Shielded leads should be used for connecting the instrument to the patient and all of these shields should be connected to a suitable ground.

An object of the present invention is to provide an instrument of the foregoing character incorporating an amplifier provided with resistance-capacity coupled stages having two-part gain control, both coarse and fine, and arranged to avoid surges or transients during operation.

Another object of the invention is to provide an amplifier, in an instrument as before described, which is made up of a plurality of stages of push-pull character with an intermediate single ended stage.

Another object of the invention is to provide in a push-pull amplifier of the type herein used, a ganged input balancing control which moves oppositely with respect to ground.

2

Another object of the invention is to provide in an amplifier of the foregoing character means for suppressing lead and other longitudinal disturbances, such means comprising a balancing gain control in combination with large self-biasing resistances in one or more stages.

Another object of the invention is to provide an arrangement whereby the instrument can be calibrated together with means for testing and indicating the resistance of electrode contacts.

An additional object of the invention is to provide in an amplifier, as before described, means for eliminating the effect of slow battery supply variations.

Another object of the invention is to provide an amplifier having a plurality of stages with successive 180° phase relationships together with means for eliminating disturbances due to battery supply variations of signal frequency.

A further object of the invention is to provide an amplifier and recording unit which supplement each other to obtain frequency equalization.

A still further object of the invention is to provide apparatus of the foregoing character in which provision is made for amplitude equalization.

A further object of the invention is to provide an instrument for the purpose described in which provision is made for adjusting or controlling the operating range of the recording device.

In carrying out the foregoing and other objects of the invention, a recording device for the purposes described can be made up in such fashion as to incorporate a lead switch whereby leads to electrodes to be attached to various parts of the body of the patient can be selectively connected to the input of the associated amplifier. This amplifier is made up of an initial push-pull input stage resistance coupled to a second push-pull stage which in turn is connected to a third stage. The coupling between the second and third stages is made single-sided to permit the introduction of certain improved types of gain and centering controls and to provide other advantages. A final stage of amplification is provided conductively coupled to the third stage, such coupling utilizing voltage regulator type gas tubes in series with the grids of the final stage. The output of the final stage of the amplifier is conductively coupled to the moving coil element of the recording device, and preferably a small amount of inductance is provided in the plate battery feed as protection against the generation of high frequency oscillations. A tuned circuit in series with an adjusting resistance is provided in shunt to the moving coil for the purpose of compensating the mechanical resonance of the moving coil system.

A distinct division has been provided between the two fore and the two after stages of the amplifier, and separate power supplies, each of a design appropriate to the respective sections of the amplifier, are furnished. The advantages resulting from this arrangement will be described in detail hereinafter. Other refinements and circuit modifications also will be described and the advantages resulting from the use of such refinements will be set forth in detail.

Other features, objects and advantages of the invention will become apparent with reference to the following detailed description of the accompanying drawings in which—

Fig. 2 is a circuit diagram of a modified arrangement of the calibrating network connected to the amplifier; and Fig. 3 is a fragmentary view of the moving coil and fixed coil used in the recording unit.

Figure 1:
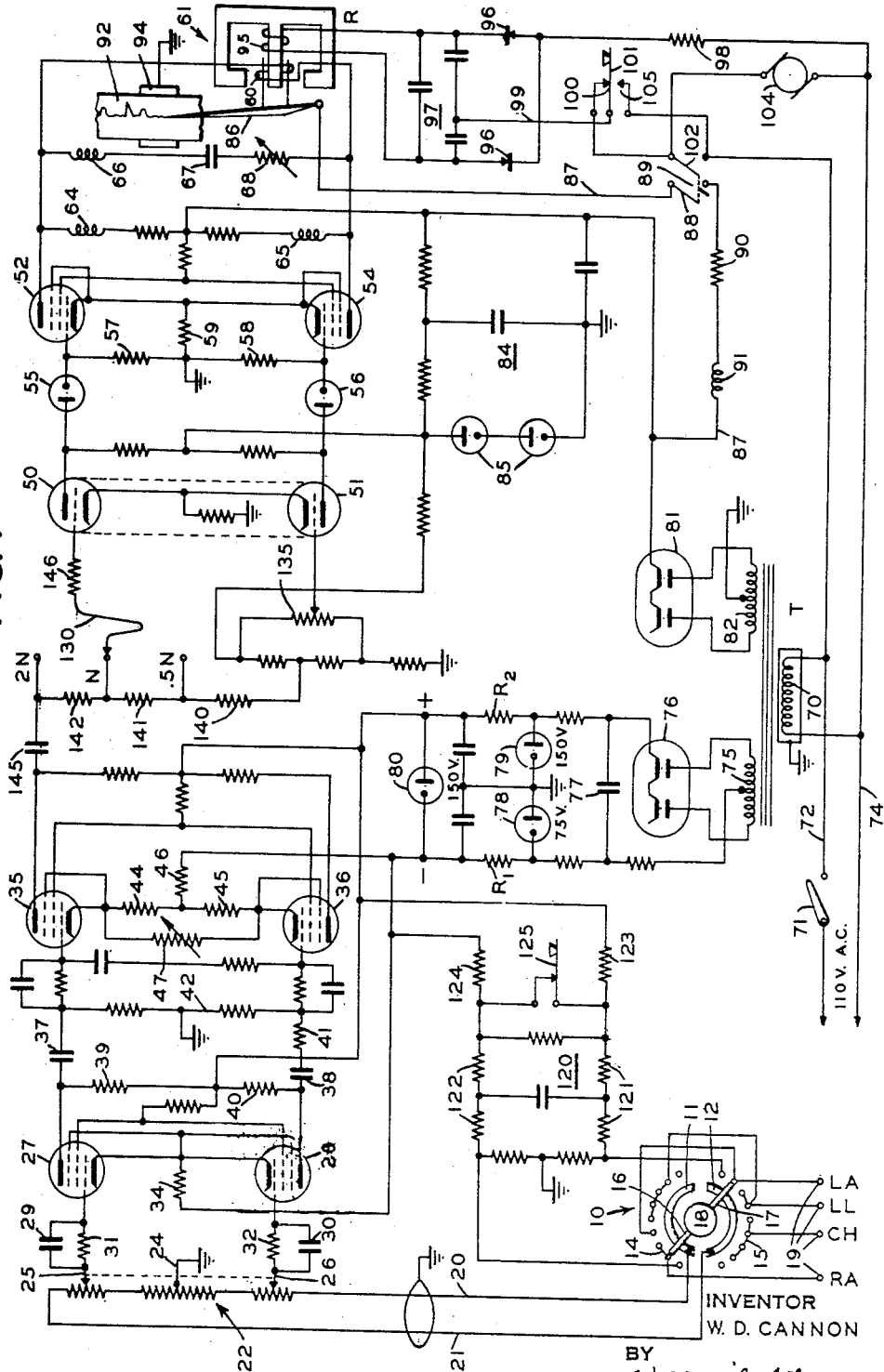
Fig. 1 is a schematic circuit diagram of a recording unit amplifier embodying the invention.

Referring to the drawings and particularly to Fig. 1, 10 indicates generally a lead switch comprising two arcuate-shaped metallic bars 11 and 12, banks of contacts 14 and 15 and conducting wipers 16 and 17 secured to a hub 18 of insulating material. The wipers 16 and 17 are adapted to make selective contact with the contacts of the banks 14 and 15 and simultaneously to make contact with the conducting bars 11 and 12. Various contacts in the two banks 14 and 15 are connected to the terminals 19, which are four in number, and which are provided for the attachment of leads to the electrodes to be applied to the various parts of a patient's body. These four terminals 19 are labeled LA (left arm), LL (left leg), CH (chest) and RA (right arm). Certain of the contacts of the two banks are strapped together whereby various combinations of electrode connections to the amplifier can be accomplished. One common arrangement of terminals and lead switch is illustrated, but any other of the common arrangements may be used, and the switch adapted accordingly. Additional contacts on the switch may be used, for example, to control styli arranged to inscribe identifying marks on the recording tape.

The two conducting bars 11 and 12 of the switch are connected respectively by conductors 20 and 21 to the opposite ends of a potentiometer 22 the midpoint of which is grounded through the conductor 24. The two conductors 20 and 21 are preferably enclosed in a metallic casing or sheath which can be grounded as indicated. The potentiometer 22 is balanced electrically with respect to ground and the moving contacts 25 and 26 thereof are connected together for movement in unison in the same direction, or oppositely with respect to ground. Two contacts 25 and 26 of the potentiometer are connected to the control grids of tubes 27 and 28, respectively, by condensers 29 and 30 shunted respectively by resistances 31 and 32. The tubes 27 and 28 may be of any desired type suitable for the purposes of the present invention, but in practice tubes of the 1620 type have been found to operate in a very efficient manner. A large self-biasing resistance 34 is located in the cathode circuit of these two tubes for a purpose to be described later.

A second pair of tubes 35 and 36 of any type having suitable characteristics, for example, tubes of the 6SJ7 type, have their control electrodes resistance coupled to the output of tubes 27 and 28 by condensers 37 and 38 and resistances 39 and 40. A resistance 41 is inserted in series with the control grid of tube 36 for a purpose to be described later. This second stage of amplification is also provided with a symmetrical network 42 which serves to emphasize lower frequency components thereby compensating for the effect of the two coupling condensers 37 and 38 which may have capacities of the order of two microfarads. The network 42 comprises resistance shunted condensers in the control grid circuits of the two tubes and a resistance in series with a condenser connected across the control grids.

The second stage, including tubes 35 and 36, is provided with a biasing network comprising individual self-biasing resistances 44 and 45, a large common self-biasing resistance 46 and an adjustable fourth resistance 47, which may be of the order of 10,000 ohms, placed in shunt to the individual resistors to serve as a fine gain control.

The third stage comprises two tubes 50 and 51 which may be separate tubes or may be enclosed in a single envelope, as indicated on the drawings, such tube being for example of the type known as 6SC7. This third stage is coupled to the output of the second stage by a single sided coupling to permit the introduction of certain preferred types of gain and centering controls and to provide other advantages. The last stage, comprising tubes 52 and 54 which may be of the 7A5 type, is coupled to the third stage by conductive coupling utilizing voltage regulator gas tubes 55 and 56 in series with the control grids of tubes 52 and 54. These voltage regulator tubes in normal operation are luminous and pass current at a constant voltage drop regardless of the current flow or voltage applied. Impressed signals, therefore, produce a varying voltage drop across the grid resistances 57 and 58 each of which may be of the order of 200,000 ohms to energize or control the output tubes 52 and 54 without any dissipation of signal potential in the gas tubes. The normal current flow across these grid resistances 57 and 58 imparts a fixed bias to the grids of these two tubes which, however, are maintained negative with respect to their cathodes by virtue of the IR drop across the cathode self-bias resistor 59 which may be of the order, for example, of 500 ohms.

The output of the final stage of the amplifier (including tubes 52 and 54) is conductively coupled to the moving coil element 60 of the recording device which is indicated generally and schematically at 61. In practice it has been found that a small amount of inductance is desirable in the plate battery feed of the tubes 52 and 54 and, accordingly, such inductance is furnished by means of light weight RF chokes 64 and 65. The purpose of this inductance is to provide protection against the generation of high frequency oscillations. A tuned circuit made up of inductance 66 and capacitance 67 in series with an adjustable resistance 68 is provided in shunt to the moving coil 60 for the purpose of compensating the mechanical resonance of the moving coil system.

As will be seen by reference to the drawings, separate sources of potential supply for the plates of the two fore and the two after stages are provided. The primary 70 of a transformer T is energized from the source of 110-volt alternating current through the main switch 71 and conductors 72 and 74. One secondary 75 of the transformer is utilized to energize a double wave rectifier 76 and filter 77. The output of the rectifier and filter is maintained constant at a suitable voltage of, for example, 225 volts by means of voltage regulator tubes 78 and 79. These two regulator tubes are arranged to provide a voltage divider which is grounded at an intermediate point located at one-third the voltage from the negative end. In other words, the voltage drop across tube 78 in this particular instance may be 75 volts while that across the tube 79 is 150 volts. As a second stage of filter use is made of a voltage regulator tube 80 operating to have a voltage drop there across of 150 volts. Since the input circuits to the control grids of the tubes of the first two stages are grounded, it follows that the grounding of the filter at a point representing 75 volts positive serves to compensate for the excessive negative bias impressed on the grids of the tubes of the two first stages occasioned by the use of the large self-bias resistors 34 and 46 so that these grids are at normal potential with respect to their cathodes. The voltage regulator tubes of themselves do not provide perfect regulation and consequently minor voltage variations will still occur. However, the effect of these variations upon amplifier gain is compensated in large degree by the degenerative, i. e., negative feedback, effect of the self-bias resistors 34 and 46 and further by the fact that both plate potential and grid bias are obtained from a common source. It follows that if plate voltage increases, the negative grid bias likewise increases, and it is well known these two effects have an opposing influence upon tube output. Since this power network is asymmetrical with respect to ground it follows that resistor R2 has a value double that of resistor R1; for example 4,000 ohms and 2,000 ohms respectively.

The last two stages of the amplifier receive their plate potential from a second rectifier 81 energized by the secondary 82 of the main transformer. In conjunction with the rectifier 81 use is made of a filter 84 which also includes voltage regulator tubes 85. This filter requires no further regulation than that provided by the tubes 85, since the last two stages of the amplifier usually employ tubes of relatively low amplification constant and, therefore, are relatively unsensitive to potential supply changes. Further, any changes in these stages are not amplified by a large number of subsequent stages.

Energizing or recording potential for the stylus 86 is also furnished by this latter source of positive potential. For this purpose, use is made of a conductor 87, controlled by one blade 88 of a switch 89. A large current reducing resistance 90 is necessary in this circuit and an inductance 91 of substantial size may also be inserted in the circuit for the purpose of insuring a constant current flow despite varying impedance conditions in the recording paper 92 which passes over a grounded drum 94.

Energizing current for the field coil 95 of the recording unit R may be furnished from the source of 110-volt alternating current through dry plate rectifiers 96 and filter 97 in which chokes have been omitted in the interest of weight economy. For the above purposes, it will be noted that the conductor 74 is extended through resistor 98 to the rectifiers, the output of which is fed through the coil 95 and through conductor 99, normally closed contact 100 of switch 101, blade 102 of switch 89 to the other conductor 72. This blade 102 of switch 89 also controls energization of motor 104 used for advancing the recording tape or paper 92.

Closing of main switch 71 controls energization of the amplifier but does not cause the supply of energizing potential to the stylus 86 and does not energize the field coil 95 or the motor 104. These latter three elements are controlled by the switch 89 which is permitted to remain open during the warmup period of the amplifier and is closed only when it is desired that actual records be made on the sensitized tape 92. This avoidance of the unnecessary use of power limits the generation of heat within the cabinet enclosing the instrument and also prevents waste of recording tape 92. The use of switch 89 also permits the stylus 86 to be immobilized to avoid damage during periods of warmup, switching or adjusting. This switch 89, however, may be shunted as far as the field coil 95 is concerned by operation of switch 101 to close the normally open contact 105 which will cause energization of the field coil for purposes of calibration or observation without influencing or affecting the stylus 86 and the tape puller motor 104.

The function of various elements heretofore described and others which have not been mentioned specifically will be set forth in the following description of the conditions arising in instruments of this character and the effects which must be combatted and overcome to obtain an accurate recording of the desired impulses.

As before pointed out, electrocardiographs and similar instruments are used for delineating potentials which may be extremely small in value and which also are irregular in pattern. Hence the necessity for the various elements before set forth will be appreciated and particularly the shielding of leads used for connecting the electrodes attached to the patient to the lead switch. These leads have not been shown since they conform to well known practices.

A principal source of pickup of outside interference is the body of the patient under examination and the leads which join the electrodes attached to the patient to the lead switch. Such interference gives rise to appreciable potential which in turn causes a current to flow over the input leads 20 and 21 and to ground at the midpoint of the input potentiometer 22. The undesirable effect thereof may be minimized by using a potentiometer 22 of as low impedance as practicable. These undesirable potentials are almost entirely suppressed before they reach the output of the second stage tubes 35 and 36 by means of the degenerative effect of the large self-biasing resistors 34 and 46. Some residual interference however will usually remain and will be present at the output of tube 35, where in the absence of further suppressive measures it would be transmitted through the final stages of the amplifier to be impressed upon the moving coil 60 of the recording unit. Necessary further suppression may now be obtained by slight readjustment of the contacts 25 and 26 of the ganged input potentiometer 22 so as to introduce a suitable neutralizing potential. These contacts move in unison in the same direction, or oppositely with respect to ground, to regulate oppositely the gain of each side of the amplifier but without influencing the combined gain. The two input tubes 27 and 28, therefore, may have considerable potential applied to their grids in parallel but the gain of this first stage of the amplifier for these common potentials is small because of the degeneration which occurs in the circuit of these two tubes in consequence of the excessively large self-bias resistor 34 which may be of the order of 30,000 ohms. If the amplifier were balanced throughout the stages thereof it would be relatively easy to balance out in this manner the residual of all longitudinal potentials picked up on the leads insofar as direct influence upon the moving coil in the recording unit is concerned. However, the successive tubes on each side of the amplifier would still be loaded with the noise potentials, and should these potentials be large, overloading of the tubes and consequent intermodulation and distortion of the signals might occur. This amplifier, however, is deliberately unbalanced between the second and third stages with the consequent requirement of elimination, in a very high degree, of all interference within the first two stages thereof.

A considerable additional suppression of extraneous interference may be achieved through the expedient of grounding one or more of the unused leads which are connected to the patient and this expedient can readily be incorporated into the lead switch 10. While it is common practice to ground the unused leads the practice is uniquely effective in this case for the following reasons: electrocardiograms are in general a species of triangulation measurements in which potentials are measured between three points spaced more or less equidistantly at the apices of an equilateral triangle. If, while the potential between any two of the points is being measured, the third is grounded, any interfering potentials will be reduced in a degree determined approximately by the symmetry of the three points. In connection with the present invention, however, moderate lack of symmetry is not particularly important because of the self-balancing nature of the input stage comprising tubes 27 and 28 which follows from the use of the large common self-bias resistor 34. If the amplifier is initially balanced by first short-circuiting the electrodes of the two leads to be used at a particular time and adjusting the input potentiometer for zero or minimum deflection of the stylus 86, any moderate asymmetry with respect to ground of the input system of the amplifier will not increase the effect of these longitudinal disturbances on the amplifier. Within ordinary operating limits, the signal voltage impressed upon the recorder will not be affected since the recorder is responsive only to a transverse input voltage.

The resistance shunted condensers 29 and 30 in series with the control grids of the tubes 27 and 28 of the first stage provides some further impedance to interfering potentials but the main function of these condensers is a precautionary one to preclude the possibility of the patient having battery potentials applied to him in the event of an accidental short-circuit occurring within these tubes of the first stage.

Theoretically if the amplifier be composed entirely of push-pull stages any uncompensated increase in supply potential, for example, would be impressed upon the two tubes of each stage in parallel, and, in a perfectly balanced amplifier would not influence the signal. However, if such potentials fluctuate at the order of a fraction of a cycle per second or higher in frequency so as to come within the frequency range of the amplifier, these potentials would be progressively amplified to place considerable loads on the grids of the output stage. While this is a longitudinal voltage and would of itself not be impressed upon the output of the recorder the overload can cause clipping of positive peaks of signal voltage and even blocking of the amplifier. These distortions unless extreme would not be revealed to the operator and might result in the recording of incorrect traces on the recording paper 92.

The single sided coupling shown intermediate the amplifier, i. e., between the second stage comprising tubes 35 and 36, and the third stage comprising tube elements 50 and 51, interrupts the normal balance so that any uncompensated voltage will pass through the last two stages of the amplifier as a transverse voltage and will be recorded on the trace 92 where it will come to the operator's attention. Equally important is the fact that in advance of the single sided coupling provision is made for neutralizing such disturbing potentials. The manner in which this neutralization is accomplished is believed to be as follows:

As is well known, a signal in its progress through a resistance coupled amplifier is dephased 180° at the output of alternate stages. Hence, distortions or disturbances which are initiated in successive stages tend to neutralize each other and in theory if the stage gains were identical perfect suppression would occur. However, in the amplifier of the present invention the first stage including tubes 27 and 28 has approximately triple the gain of the second stage including tubes 35 and 36 so that the disturbances due to anode battery fluctuations can be said to originate principally in the first stage. The remedy then is to exaggerate the like disturbance originating in the second stage until it is equal to that arising in the first stage. This can be readily accomplished by partially unbalancing the longitudinal path so as to produce in effect a transverse voltage of the appropriate magnitude at the control grid of the working tube (tube 35) of the second stage.

In the present circuit this requirement is met by the introduction of the resistance 41 which may be of the order of 75,000 ohms in series with the control grid of the other tube 36 of the second stage. Once determined this resistance remains fixed and it provides a virtually complete suppression of the signal frequency disturbance due to any rapid fluctuation of the plate potentials in the first section of the amplifier. The value of this resistance 41 is dependent upon general design features of the amplifier and power supply and may vary considerably. For best results in some instances, it may be necessary to insert such a resistance in series with the control grid of the working tube 35 of the second stage instead of in series with the compensating tube 36.

Since the gain of the entire amplifier will vary slightly over periods of time due to temperature changes, tube characteristics changes and other causes, it is desirable and in fact necessary to provide convenient means for calibrating the amplifier. To this end the first contact of each of the banks 14 and 15 are connected to a resistance network 120 which in turn is connected to the plate potential supply. This network, as will be seen from the drawings, is balanced to ground with respect to voltage and is normally short-circuited by means of switch 125. This network like the power supply network 77 is asymmetrical with respect to ground and for this purpose resistors 121 each have a value double that of resistors 122, and resistor 123 has a value double that of resistor 124. Should the contact arms 16 and 17 be brought into register with the first contacts of the banks 14 and 15 and the switch 125 opened, a potential of predetermined magnitude, for example, one millivolt, is then applied through leads 20 and 21 across the input of the amplifier. With the gain control 130 in the input of tube section 50 set on the normal or N position, a deflection of the stylus 86 of the order of one centimeter should occur. If this deflection is not of the proper order adjustment of the amplitude of the signals impressed on the moving coil 60 can be made by means of the fine gain control 47 included in the second stage.

Two additional fixed positions are available on the gain control interposed between the second and third stages, as will be noted, the upper one of which is marked 2N and the lower one of which is marked .5N. These positions indicate, respectively, twice normal and half normal and are provided for the convenience of the operator in examining patients who produce traces on the recording paper 92 of subnormal or abnormal amplitudes, respectively, or if for other reasons it is desirable to expand or contract the trace delineations.

This convenient and accurate calibrated pulse obtained by opening the switch 125 is also of considerable general utility in the practical operation of the cardiograph since it can be used for checking on the functioning of the instrument and for marking the traces in accordance with any desired code to indicate, for example, change of leads or other conditions occurring during the tests in progress.

In order that the gain control just described may be of a fine nature the adjustable resistor 47 is of relatively low impedance. For the three steps .5N, N, and 2N resistances 140, 141 and 142 of fixed value are used and are so arranged that manipulation of the switch contact 130 from one position to another does not alter the charge on the coupling condenser 145 which may be of the order of 2 microfarads. If condenser charging surges were permitted to occur during these operations, they would be reproduced on the recording tape 92 and it would be necessary to allow time for the stylus 86 to return to normal. However, a relatively large resistance 146, for example, of 500,000 ohms is included in series with the control grid of the tube 50 of the third stage to prevent the flow of charging current to condenser 145 should voltage surges occur of sufficient magnitude to drive this grid positive.

A major result of the use of the single sided coupling between the second and third stages of the amplifier is that such coupling permits the adoption of a convenient centering control for the tracing being made, such centering control operating in a circuit of low impedance and with zero time constant. Hence, the trace can be readily centered or otherwise relocated on the tape by adjustment of potentiometer 135 which varies the relative potentials on the grids of tubes 50 and 51, without introducing any spurious recovery effects such as would follow if the centering control were included in a circuit possessing an appreciable time constant.

A modified calibrating arrangement is shown in Fig. 2. In this arrangement the network 220, similar to network 120 previously described, instead of being connected to the first two contacts of the banks 14 and 15 is connected across small identical parts of the input potentiometer 22 as indicated by the conductors 221 and 222 extending from the network to the potentiometer. The advantages which can be obtained by this arrangement reside in the provision of means whereby a qualitative check on electrode resistance can readily be made. In the use of an electrocardiograph, low electrode contact with the skin of the patient is important since otherwise the generated potential applied to the instrument will be low and interference will tend to be high. Consequently, with the arrangement of the modification shown in Fig. 2, the switch 225 similar to switch 125 can be operated at any desired time to apply the predetermined potential to the input of the first stage of the amplifier. Application of this potential should cause a standard deflection on the trace being made. However, if any operative pair of leads is connected to the patient and to the amplifier input, the calibrating pulse will be shunted by the electrodes and the body of the patient according to the amount of resistance in this circuit. Hence, regardless of the position of the lead switch 10, a deflection will be noted and if this deflection indicates an appreciable amplitude it is an indication to the operator that the electrode resistance is unsatisfactorily high and corrective measures should be taken.

In order that potentials produced by the heart action may be satisfactorily recorded, it is necessary to provide an amplifying and recording system which will linearly record frequencies over the range reaching from a fraction of a cycle to approximately fifty cycles. The resistance coupled amplifier as hereinbefore described is designed to amplify low frequencies and in addition the compensating network 42, before described, is included in the amplifier following the coupling condensers of the first stage. This network is intended to emphasize the lower range of frequencies as a compensation for the effect of the coupling condensers 37 and 38. The recording element or moving coil 60 of the recorder R has a natural frequency in the neighborhood of fifty cycles. To compensate for the emphasis which would otherwise occur at this frequency, the damped resonant network 66, 67, 68 is connected in shunt to the moving coil.

While the recording unit R used in the present device superficially resembles other units of the type utilizing a fixed coil and a moving coil, two unique expedients have been adopted in the design of the pole piece of the present unit for two purposes, namely, first, increasing the available flux density in the air gap thereby to increase the efficiency of the unit, and second, so shaping the pole piece that the flux density is greatest at the extremities of travel of the moving coil thereby to compensate for the falling off of power output from the amplifier which occurs at extreme amplitudes. Together these features permit the attainment of deflections at the stylus of plus or minus three-fourths of an inch with a fully satisfactory degree of amplitude linearity.

Referring now to Fig. 3, a portion of the recording unit has been illustrated in fragmentary fashion, such recording unit comprising the stylus 86 supported by a flexible member 150 in the nature of a spring which permits movement of the moving coil 60 attached to the lower edge of a form 151 which in turn is secured to the stylus carrying arm 152. The fixed coil 95 surrounds part of a core 154 which extends upwardly through the pole piece 155. The pole piece and the core define the air gap of the unit and the available flux density for such air gap is determined by the cross section of the core which in turn is limited by the overall size and weight requirements of the cardiograph. To accommodate the wide swing of the moving coil 60 which would be necessary to cause the desired deflection of the end of the stylus 86, it has been necessary to thicken the pole piece 155 considerably and to accept a considerable reduction in flux density as a result. By the unique shaping of the pole piece this reduction is not as large as otherwise would be necessary and by referring to Fig. 3 it will be seen that the upper and lower surfaces of the pole piece are symmetrically tapered as at 156 and 157 as regards the area presented to the air gap. The thinner portion of the pole piece is on the side thereof closest to the pivot 150 where the travel of the moving coil is smallest. By thus proportioning the pole piece air gap area to the boundary of the moving coil travel in all parts of the air gap, it is possible to lessen substantially the average thickness of the pole piece with a consequent increase in effective flux density in the air gap. In this particular unit it has been possible to increase the air gap density by approximately 40%.

Referring again to Fig. 3, it will be noted that the inner surface of the pole piece 155 is provided with two serrations or recesses of annular nature 160 and 161 which define the air gap. These serrations are for the purpose of concentrating the flux at the extremities of the coil travel by providing a thinner air gap at those points. By this means the efficiency of the unit is increased markedly at heavy load in order to compensate for the loss of efficiency or falling off of output of the amplifier at heavy load. The thinning of the air gap at the center caused by the rib 162 is also desirable as a means for preserving linear response at this point in the coil travel.

In the detailed description of the amplifier and other parts certain circuit elements have not been referred to directly and it will be understood that these elements operate in conventional fashion. In addition it should be noted that the power supply for heating the cathodes of the various tubes has been omitted since these tubes may be of the type employing separately energized heaters and function in a conventional manner.

The recording paper or tape 92 used in this apparatus is of the electrosensitive type of well known character in which the passage of current through the paper from a stylus to a grounded drum or other supporting member causes a change in the physical character of the paper at the points of stylus contact. Hence with the stylus maintained in constant contact with the paper, an accurate trace of the potentials supplied the moving coil of the recorder can be made.

From the foregoing it will be seen that the present invention provides a recording unit of unique type wherein the parts may be made as small and light as is possible for reduction of size and weight, and further that the invention provides an amplifier for treating the potentials generated by biological action to such a degree as to cause them to operate the recording unit for the production of suitable traces. The amplifier has been so constructed as to provide extraordinary measures to eliminate the effect of disturbances which would be of a highly undesirable nature due to the high gain amplifier. These measures may be briefly recapitulated as follows:

First, initial protection is realized as far as possible through the shielding of all exposed parts of the amplifier and the leads and grounding of the idle leads. Next, any residual longitudinal voltage remaining at the output of the second stage after suppression by means of the common self-bias resistors is then substantially completely removed through the expedient of introducing a small opposing voltage by slightly unbalancing the ganged input potentiometer. Longitudinal potentials present in the leads thus undergo a suppression of the order of 90 decibels before reaching the recording unit. Further, power supply noise is prevented by shielding the transformer primary, by adequate filtering, and by supplying both the plate and grid potentials from a common source. Wide fluctuations in these potentials are prevented by means of voltage regulator tubes while the minor residual fluctuations are rendered ineffective by the nature of the common plate and grid supply and by the large self-biasing resistances. Finally, fluctuations of the power supply potentials rapid enough to produce false signals are eliminated by a neutralization process in the first two stages of the amplifier.

Other features incorporated in the amplifier have been described in detail but it is evident that modifications beyond the illustrated embodiment may be made without departing from the scope of the invention which scope is to be construed as that defined by the following claims.

What I claim is:

1. In a signal amplifying system having an input circuit for push-pull signal potentials and embodying a plurality of push-pull stages of amplification one of which comprises the first stage of the amplifier, the cathode-plate circuits of the tubes of said first stage having a common portion, means for suppressing extraneous longitudinal interfering potentials impressed upon the input circuit and for preventing interference with the signal potentials by said interfering potentials in the first stage of the amplifier, comprising in combination a ganged potentiometer in the input circuit of said first stage for slightly unbalancing said longitudinal interfering potentials and operative to increase the longitudinal interfering potential on the grid of one tube of said stage while decreasing the longitudinal interfering potential on the grid of the other tube of said stage, and means for producing negative feedback in said stage comprising a relatively large degenerative unbypassed resistor in series in said common portion of the cathode-plate circuits of said stage for suppressing longitudinal interfering potentials that are impressed on the first stage by said ganged potentiometer, and an output circuit coupled between ground and that side of a subsequent amplifier stage in which the interfering potential has been canceled.

2. A system according to claim 1, in which at least two of the push-pull stages of the amplifier each has a common unbypassed resistor in the cathode-plate circuits of the tubes.

3. In a signal amplifying system having a plurality of stages of amplification for amplifying small push-pull input potentials, the combination of two successive push-pull stages in which the gain of the first stage is substantially greater than the gain of the second stage and means whereby said two stages each has generated therein similar interfering potentials but opposite in phase respectively, means comprising an impedance included in one side of the coupling between said two stages having a value which will unbalance the second stage and increase the amplitude of the interfering potentials generated in that stage to an amount substantially equal to that of the interfering potentials generated in said first stage to neutralize the same, and an output circuit coupled between ground and that side of a subsequent stage of the amplifier in which the interfering potential has been canceled.

4. A system according to claim 3, including means comprising a ganged potentiometer in the input circuit of the first push-pull stage of the amplifier operative to increase extraneous longitudinal interfering potential on the grid of one tube of said stage while decreasing the extraneous longitudinal interfering potential on the grid of the other tube of said stage for slightly unbalancing said longitudinal interfering potentials, the cathode-plate circuits of the tubes of said first stage having a common portion, and means for producing negative feedback in said first stage comprising a relatively large degenerative unbypassed resistor in series in said common portion of the cathode-plate circuits of said stage for suppressing longitudinal interfering potentials that may be impressed on the first stage by said ganged potentiometer.

5. In a signal amplifying system comprising a series of push-pull amplifier stages subjected to progressive amplification of input signal potentials and also interfering longitudinal potentials through said stages, an indicating device connected to the output circuit of said system, means for causing the presence of said interfering longitudinal potentials to be revealed by said indicating device and distinguishable from said signal potentials, comprising an unbalanced stage having its input connected between ground and that side of the output of one of said push-pull stages in which the interfering potentials are to be canceled and having its output connected to the input of a balanced stage in the output circuit of the system for converting said interfering longitudinal potentials to transverse potentials for actuating said indicating device, and adjustable means in the first stage of said series of amplifier stages for effecting neutralization of said disturbing longitudinal potentials revealed by the indicating device.

6. A system according to claim 5, in which said unbalanced stage immediately precedes the last balanced stage of the amplifying system.

References Cited in the file of this patent

UNITED STATES PATENTS

| Number | Name | Date |
|---|---|---|
| 1,822,922 | Culver | Sept. 15, 1931 |
| 1,824,801 | Bouton | Sept. 29, 1931 |
| 2,022,972 | Nebel | Dec. 3, 1935 |
| 2,185,367 | Blumlein | Jan. 2, 1940 |
| 2,226,238 | Doba, Jr. | Dec. 24, 1940 |
| 2,240,635 | Avins | May 6, 1941 |
| 2,272,452 | Whittle | Feb. 10, 1942 |
| 2,273,997 | Rubin | Feb. 24, 1942 |
| 2,342,171 | Turner, Jr. | Feb. 22, 1944 |
| 2,383,846 | Crawley | Aug. 28, 1945 |
| 2,419,099 | Wall | Apr. 15, 1947 |
| 2,466,691 | Daniels | Apr. 12, 1949 |
| 2,552,588 | Reeves | May 15, 1951 |
| 2,558,954 | Henson | July 3, 1951 |
| 2,571,223 | Edinburg | Oct. 16, 1951 |

FOREIGN PATENTS

| Number | Country | Date |
|---|---|---|
| 111,020 | Australia | July 10, 1940 |
| 250,536 | Switzerland | Mar. 3, 1945 |
| 562,817 | Great Britain | July 18, 1944 |